May 17, 1927.
J. G. BAILEY
1,629,248
BROADCAST DISTRIBUTING MACHINE
Filed Dec. 31, 1925   3 Sheets-Sheet 1
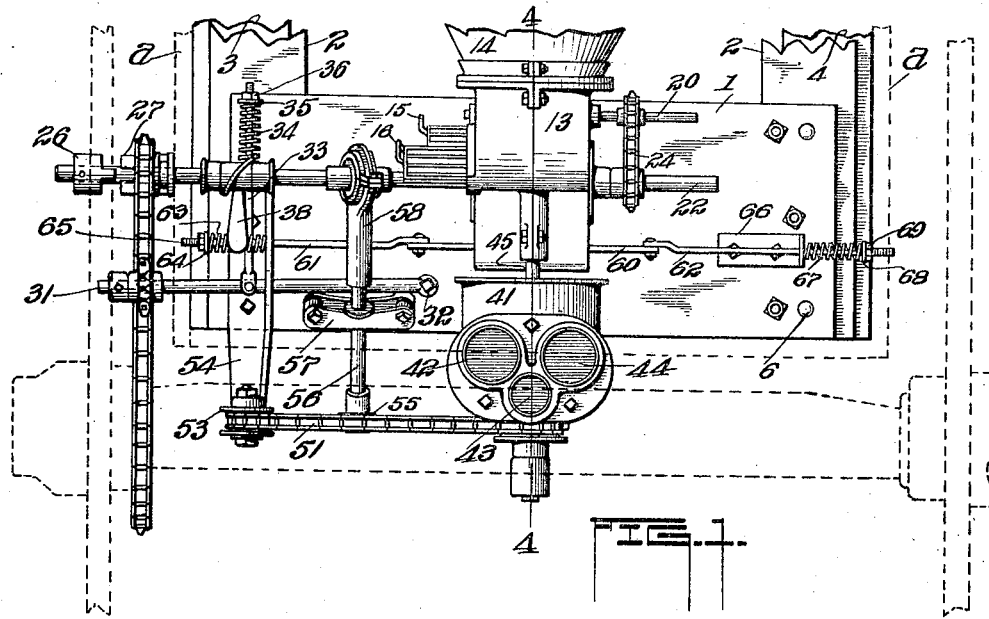
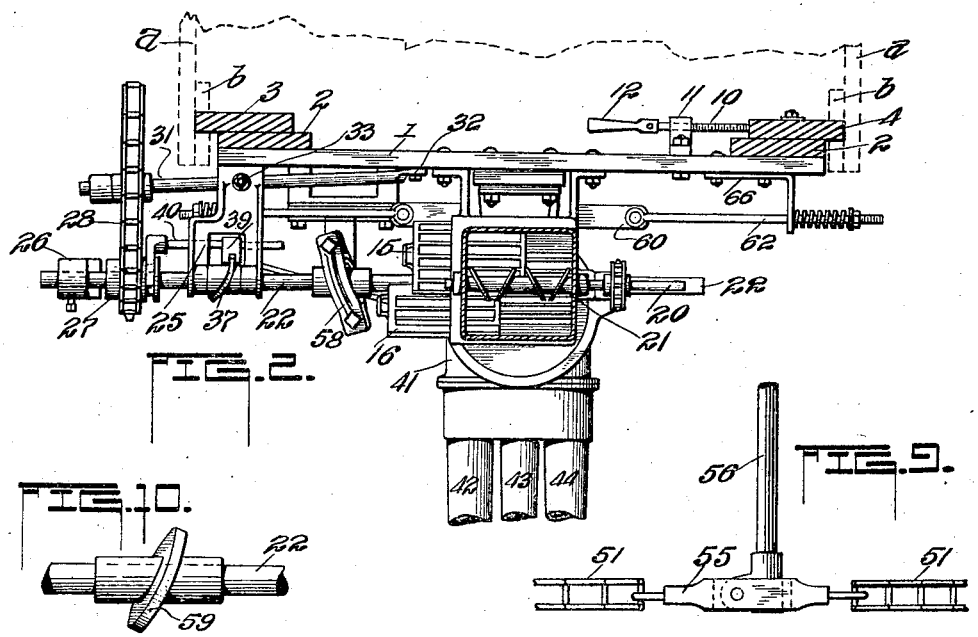

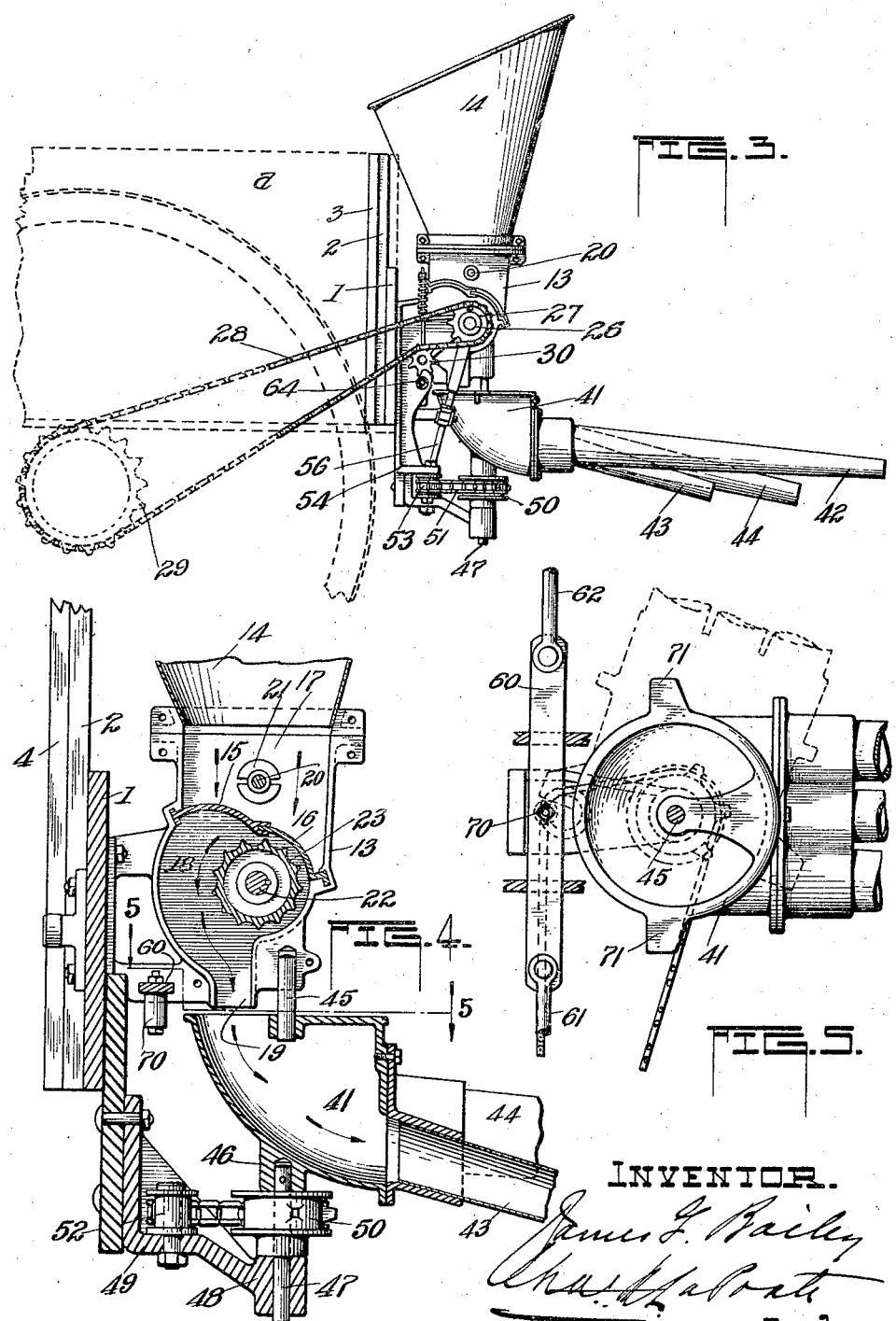

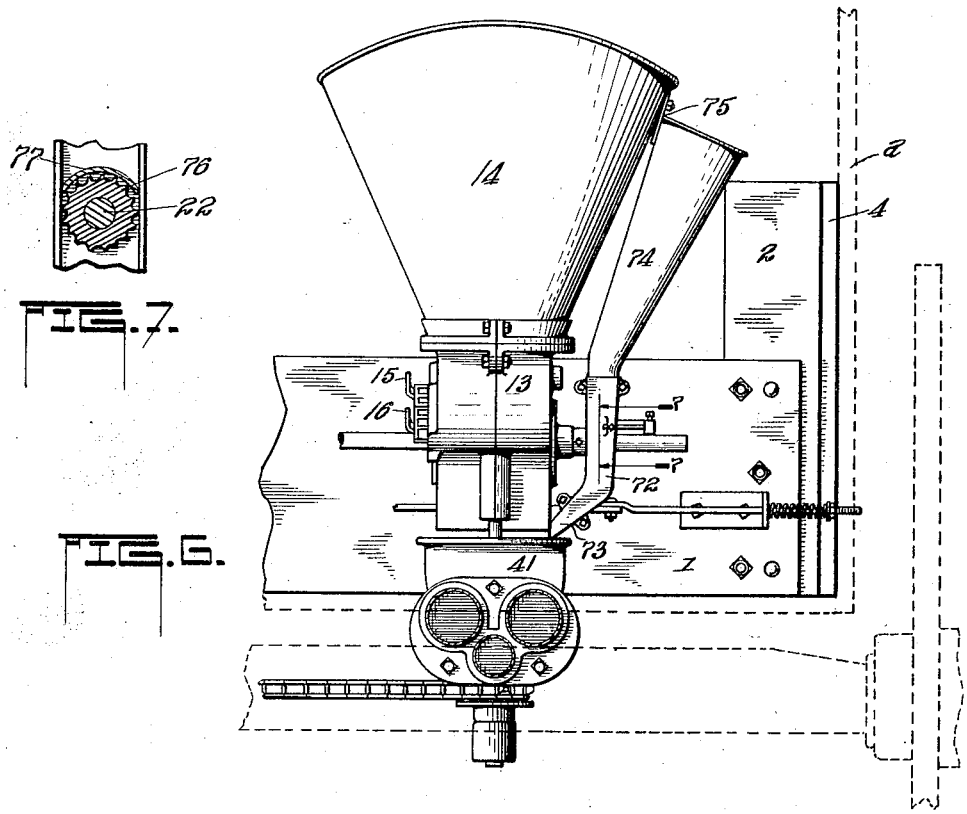

Patented May 17, 1927.

1,629,248

UNITED STATES PATENT OFFICE.

JAMES G. BAILEY, OF DELEVAN, ILLINOIS, ASSIGNOR TO UNIVERSAL BROADCASTER MFG. CO., OF EAST PEORIA, ILLINOIS, A CORPORATION OF ILLINOIS.

BROADCAST DISTRIBUTING MACHINE.

Application filed December 31, 1925. Serial No. 78,561.

This invention has reference to broadcast distributing machines and is adaptable for use in the distribution of grain, seeds, lime, phosphate, arsenic of lead, for spraying cotton or vegetables and for other and like uses.

The invention has for one of its objects to provide a machine of this character with one or more distributing spouts, preferably a plurality, adaptable to be swung alternately in opposite directions, the spouts being of different lengths, whereby to increase the area of distribution over which the material is cast; feeding means being provided from the material retaining receptacle or hopper, with controlling valves for regulating the amount of material fed to the spouts.

The invention has for a further object to provide a novel means for imparting oscillatory movement to the spouts whereby they are swung alternately in opposite directions, and to means for absorbing any jar incident to the change in direction of movement as the spouts are swung alternately in opposite directions.

The invention has for a still further object to provide an end gate support for the distributor, including means whereby it is made possible to apply and remove the end gate from between the cleats on the side boards of the wagon box by inserting and removing the end gate laterally instead of lifting and sliding the end gate vertically between said side board cleats.

The improvement comprehends in its detail a pulverizing or agitating means for breaking up any lumps of material during the feeding of the same to the spouts, and to a grass seed attachment including feeding means for simultaneously feeding grass seed with the grain or other material, or separately if desired.

That the invention may be more fully understood, reference is had to the accompanying drawings forming a part of the present description, illustrating a preferred embodiment of the invention, in which:—

Figure 1 is a rear end elevation of the distributor with end gate attachment applied to a wagon, the latter being shown in dotted lines;

Figure 2 is a plan view of Figure 1, the distributing spouts being broken away;

Figure 3 is a side elevation looking in at the left hand side of either Figure 1 or Figure 2;

Figure 4 is a vertical sectional view, substantially as the same would appear, if taken on the line 4—4, Figure 1.

Figure 5 is a detail or plan, substantially as the same would appear if taken on the line 5—5, Figure 4, dotted lines showing the spouts swung into different position and the manner in which the absorbing means functions;

Figure 6 is a view somewhat similar to Figure 1, with parts omitted and including the grass seed attachment;

Figure 7 is a sectional detail of the grass feeding means, as the same would appear if taken on the line 7—7, Figure 6;

Figure 8 is a detail perspective view of the end gate attaching means, looking at that side of the end gate within the wagon box.

Figure 9 is a detail of parts included in the means for oscillating the spouts;

Figure 10 is a detail showing the actuating means employed for oscillating the spouts, and Figure 11 is a detail of a modified structure for the spouts by means of which they are tilted into different positions.

Like characters of reference denote corresponding parts throughout the figures.

End gate and supporting means.

The end gate 1 is of the usual construction, except that it is of less width than the inside width of the wagon box A between the side boards $a$ and the cleats $b$ attached thereto, see Figure 2. To the rear face of the end gate and at opposite ends thereof, are fixedly secured upstanding board members 2 preferably of a heighth greater than the depth of the end gate and extending thereabove, see Figures 1 and 6, to give a better support for the end gate. These boards are flush with the ends of the end gate. Fixedly secured to one of the boards 2 is a board 3 of similar construction and height except that it extends beyond the end of the end gate and board 2 and forms a flange on the end gate adapted to be inserted in a groove formed by the spacing of a set of cleats on a side board *a*. To the opposite board 2 is slidably connected a board 4 similar to the board 3 and adapted to function like the board 3 between a set of cleats *b*. The board 3 is provided with sets of horizontally disposed slots 5 for the reception of bolts 6 which pass through the end gate, and also the board 2 and having threaded relation with said bolts are nuts 7 bearing against washers 8. By releasing the nuts, it will be observed, by looking at Figure 8, that the board 4 may be moved over the surface of the board 2 so as to provide a flange for the end gate to be inserted in the space between the cleats *b*, see Figure 2. To slide the board 4, a handle or grip 9 is provided attached thereto. To lock the end gate in position, a threaded rod 10 is provided which has a threaded relation with a nut 11 secured to the end gate 1 and to one end of said rod is connected a hand hold 12 for turning the rod, its opposite end adapted to abut and bear against the board 4 for securing it in position between the cleats *b* of the wagon box.

It has been customary in end gate attachments of this character, so far as I am aware, to provide for connecting the end gate between the cleats *b* by lifting the end gate above the wagon box and to slide it into position vertically with the attaching means dropping into position between the cleats *b*. Distributors are of considerable weight and it has been considerable burden on the attendant to lift the end gate with the distributor attached up above the wagon box to drop it into position. I overcome this by my novel attaching means which makes it only necessary to lift the end gate up to the open end of the wagon box, insert the board 3 into position between the cleats 3 and then to slide the board 4 into position between the cleats *b* at the other side of the box and to fix and lock the same into position by the means described and best shown in Figure 8. It being understood, of course, the nuts have first been released and the board 4 slid back into unattachable position. This not only provides a simple and convenient attaching means for the board, but when the board is attached to the wagon box, it is firmly secured into position.

*Seeding or fertilizer distributing means.*

A housing 13 comprising separable sections, is bolted to the end gate 1. This housing supports a receptacle or hopper 14 into which the material to be distributed is shoveled from the wagon in the usual manner. The housing by means of sliding valve plates 15 and 16 is normally divided into compartments 17 and 18, the latter at its lower end being provided with a discharge outlet 19. Extending through the compartment 17 is a shaft 20, and said shaft within the compartment is provided with agitating or pulverizing plates 21 which diverge with respect to each other to make the same more effective. Extending through the compartment 18 is a shaft 22, which will be referred to as the operating shaft for the distributor and on said shaft and within said compartment is a fluted feed roller 23. This feed roller is positioned in relation beneath the valve plates 15 and 16 so that when one or both are opened the material passing down through the compartment 17 comes directly into contact with said feed roller. Although no graduations are shown on these valve plates, such would be employed in actual practice, as is customary, so as to regulate the quantity of material to be sown. The agitating or pulverizing shaft 20 is driven from the shaft 22 by means of a sprocket chain 24 engaging sprocket wheels on these shafts. The outer end of the shaft 22 passes through and has a bearing in a bracket 25 secured to the end gate and on the end of the shaft is secured a clutch member 26 with which a sprocket wheel 27 on the shaft 22 is adapted to have a clutch connection. This sprocket wheel is engaged by a sprocket chain 28 adapted to be driven from a sprocket wheel 29 connected with a rear wheel of a wagon. A proper tension is maintained in this sprocket chain by passing it over an idler sprocket 30 on a shaft 31 pivoted at its inner end at 32 to the end gate. To this shaft is connected a rod 33 passing up through the bracket 25 and carrying a coiled spring 34 bearing against the bracket at one end and a washer 35 at its opposite end held in proper position to produce the required tension in the spring by means of a nut 36 having a threaded relation with the upper end of said rod 33. To move the clutch sprocket 27 into and out of clutch connection with the clutch 26, I provide a cam like member 37 loose on the shaft 22 and located on a bifurcated opening in the bracket 25. The cam like member has a handle 38 to rotate it on the shaft 22 and said cam like member engages a block 39 connected with a slidable rod 40 which has an arm connection with the clutch sprocket 27 all best seen in Figures 1 and 2. With this means, the attendant can control the operation of the shaft 22 and the parts operated thereby, as will be understood.

Supported for oscillation below the housing 13 is a hopper like member 41, see Figure 4. This hopper is located to receive material discharged from the compartment 18 of the said housing and is formed or provided with a curved bottom to direct material received therein to the discharge spouts 42, 43 and 44 connected thereto and preferably extending rearwardly therefrom in a somewhat inclined position. The inclination of these spouts may vary with respect to each other and preferably do, as indicated in Figure 3 and also preferably vary in length with respect to each other. As depicted in Figs. 1 and 6 of the drawings, the spouts 42 and 44 are arranged in a horizontal plane or in side by side relation at their receiving ends, while the spout 43 has its receiving end disposed beneath the spouts 42 and 44 and therebetween, whereby the three spouts have a substantially triangular relationship. The discharge ends of all the spouts are disposed at different elevations, with respect to the surface being treated. This arrangement, as determined by practice, not only gives the proper width of broadcast but also increases the area of broadcast in the rear of the wagon. In other words, I obtain a more uniform and equal distribution than has been possible with devices of like character, and especially of those devices employing one or more broadcast distributing fans. To pivotally support the hopper for oscillation, I provide a short shaft or upstanding stem 45 from the upper part of the hopper which is journaled in a bearing in the housing 13, see Figure 4, and the curved bottom of the hopper has a depending bearing 46 in axial alignment with a shaft 45 and into said bearing extends a shaft 47 carried by a spaced bearing 48 forming part of or connected to a bracket 49 secured to the end gate and between the two bearings 46 and 48 is disposed a sprocket drum 50 carried by the shaft 47. The hopper 41 and sprocket drum being connected to oscillate together. Engaging the teeth of the sprocket drum 50 is a sprocket chain 51 which passes over a roller 52 journaled in the bracket 59 and disposed immediately in front of the sprocket drum 50, see Figure 4, and said chain also travels around a roller 53 disposed to one side of the hopper 41 near one end of the end gate and which is journaled in a depending arm 54 of the previously described bracket 27. The forward run of the chain 51 has coupled therein or thereto a link bar 55 to which is pivotally connected an upstanding rod 56 which passes up through a guide 57, see Figure 1, secured to the end gate and on said rod within said guide is a flanged roller which has movement in the guide. To the upper end of this rod 56 is connected what may be termed an eccentric strap 58 which engages an eccentric member 59 carried in the shaft 22, see Figures 1 and 10. In operation, as the shaft rotates, the strap 58 is oscillated, swinging the lower end positively back and forth and thereby imparting to the chain 51 movement alternately in opposite directions which in turn oscillates the hopper 41 and the distributing spouts 42, 43 and 44.

Absorbing mechanism.

To absorb any jar incident to the oscillation of the hopper 41 and spouts, I provide a horizontal bar 60 which is disposed horizontally of the end gate and in front of the housing 13 which at its opposite ends are connected rods 61 and 62, the former passing through the arm 54 of the bracket 25 and carried on said rod is carried a coiled spring 63 bearing against said bracket arm at one end and a washer 64 at its other end, the position of which is adjusted by means of a nut 65 threaded on the rod 61 and which is used for increasing or lessening the tension in the spring 63. The rod 62 passes through a bracket 66 secured to the end gate and on said rod is a coiled spring 67 bearing at one end against the bracket 66 and at its opposite end against a washer 68 held in place by a nut 69 which is threaded on the rod 62 and which is used to incerase or lessen the tension in the spring 67. The bar 60 is guided in its movement through the bracket arm of the housing 13, see Figures 4 and 5 and mediate its ends has depending therefrom a roller 70 adapted to be engaged alternately by diametrically disposed stop fingers or lugs 71 formed on or attached to the hopper 41, see Figure 5. This mechanism in addition to taking up the jar incident to the stoppage and reverse movements imparted to the hopper and spouts will, through the compression of the springs 63 and 67, tend as they are released to assist in imparting the reverse motion to hopper and spouts.

Grass seed attachment.

In Figure 6, the grass seed attachment is shown comprising a housing 72 supported from the end gate and which is provided with a discharge spout overlying the hopper 41. To the upper end of the housing 72 is connected a receptacle or hopper 74 for containing the grass seed and the upper end of said receptacle is attached to the receptacle 14 of the distributor, as at 75. The operating shaft 22 passing through the housing 72 and on it is carried a fluted roller 76, see Figure 7, and above said roller is arranged a slide valve 77 which is regulated in the usual manner, as in devices of this character. The function of the grass seed attachment being well understood, further description seems unnecessary.

Referring to Figure 11, a modification of the hopper like member and distributing spout is shown comprising the hopper member 41$^a$ and adjustably connected thereto the distributing spout 78, having adjustable connection to said hopper member by means of a pivotal pin 79 on the underneath side and held in normal distributing position by a removable pin 80. By removing the pin 80 and lowering the spout into the full line position and replacing said pin at the point 80' for securing said spout in position, it will be readily understood that when wet lime or other wet material is being distributed, that such material will, by the further aid of gravity, due to the increased inclination of the spout, be quickly distributed from said spout and not tend to clog up the same as is experienced when the spout is in normal distributing position, as shown in dotted lines in said figure.

The relation of the several elements of the distributor having been described in detail, it is thought unnecessary to further detail their functions and operations further than as stated, and while I have described the detail construction, and arrangement of the preferred embodiment, it is obvious that modifications may be made further than is herein indicated without departing from the spirit and scope of the invention and I therefore do not limit myself except as may be expressed in the claims.

What I claim is:—

1. In a broadcast distributing machine, in combination, feeding means, a hopper supported beneath the feeding means and a plurality of distributing spouts extending from said hopper, said spouts being variable in length with respect to each other, and having their discharge ends at different elevations with respect to the surface being treated.

2. In a broadcast distributing machine, in combination, feeding means, distributing means supported for oscillation beneath said feeding means, an operating shaft connected with the feeding means, an endless chain connected with the distributing means for oscillating the same, means to support the other end of the chain and means connected with said operating shaft for reciprocating the chain.

3. In a broadcast distributing machine, feeding means, a hopper therebeneath, and a plurality of distributing spouts extending from said hopper, said spouts having their receiving ends arranged in an approximately triangular relationship, said spouts being variable in length with respect to each other and having their discharge ends at different elevations with respect to the surface being treated.

In witness whereof, I have hereunto affixed my hand and seal this 24th day of December, 1925.

JAMES G. BAILEY.